United States Patent
Colin

(10) Patent No.: US 7,952,244 B2
(45) Date of Patent: May 31, 2011

(54) TURBOJET HAVING AN ELECTRICITY GENERATOR ARRANGED IN ITS FAN

(75) Inventor: Antoine Colin, Brunoy (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 12/246,604

(22) Filed: Oct. 7, 2008

(65) Prior Publication Data

US 2009/0115295 A1    May 7, 2009

(30) Foreign Application Priority Data

Oct. 8, 2007    (FR) .................................... 07 58130

(51) Int. Cl.
  H02K 55/00    (2006.01)
  F02K 5/02    (2006.01)
(52) U.S. Cl. ............ 310/67 R; 290/52; 290/55; 310/52; 310/54; 701/100; 415/10; 415/144
(58) Field of Classification Search .................... 290/52, 290/54; 310/67 R, 52, 54; 701/100; 415/10, 415/144
See application file for complete search history.

(56) References Cited

U.S. PATENT DOCUMENTS

| | | | | |
|---|---|---|---|---|
| 2,853,638 A | | 9/1958 | Bonnano et al. | |
| 3,735,593 A | * | 5/1973 | Howell | 60/226.1 |
| 3,796,511 A | * | 3/1974 | Hansen | 415/144 |
| 4,057,270 A | * | 11/1977 | Lebost | 290/54 |
| 4,367,413 A | * | 1/1983 | Nair | 290/52 |
| 4,732,535 A | * | 3/1988 | Tubbs | 415/144 |
| 5,220,231 A | * | 6/1993 | Veronesi et al. | 310/90 |
| 5,223,759 A | * | 6/1993 | Shimoda et al. | 310/156.54 |
| 5,607,329 A | * | 3/1997 | Cho et al. | 294/89 |
| 6,249,071 B1 | * | 6/2001 | Lopatinsky et al. | 310/156.38 |
| 6,353,790 B1 | * | 3/2002 | Tsuzuki | 701/100 |
| 7,154,191 B2 | * | 12/2006 | Jansen et al. | 290/55 |
| 7,399,158 B2 | * | 7/2008 | Care et al. | 416/1 |
| 2007/0024132 A1 | * | 2/2007 | Salamah et al. | 310/64 |
| 2007/0029803 A1 | | 2/2007 | Randall | |
| 2007/0075598 A1 | * | 4/2007 | Tung et al. | 310/67 R |
| 2007/0138983 A1 | * | 6/2007 | De Filippis et al. | 318/254 |
| 2007/0265761 A1 | * | 11/2007 | Dooley et al. | 701/100 |
| 2008/0279675 A1 | * | 11/2008 | Ullyott | 415/1 |
| 2009/0169367 A1 | * | 7/2009 | Wadia et al. | 415/151 |

FOREIGN PATENT DOCUMENTS

| | | |
|---|---|---|
| DE | 1 803 419 | 6/1969 |
| GB | 2 360 752 A | 10/2001 |
| GB | 2 409 936 | 7/2005 |
| WO | WO 2005/073519 A1 | 8/2005 |

OTHER PUBLICATIONS

U.S. Appl. No. 12/109,929, filed Apr. 25, 2008, Colin.
U.S. Appl. No. 12/179,911, filed Jul. 25, 2008, Beutin, et al.

* cited by examiner

*Primary Examiner* — Burton Mullins
*Assistant Examiner* — Terrance Kenerly
(74) *Attorney, Agent, or Firm* — Oblon, Spivak, McClelland, Maier & Neustadt, L.L.P.

(57) ABSTRACT

The turbojet comprises a high pressure spool and a low pressure spool driving a fan. In order to produce electricity, it further includes an electricity generator arranged in the fan and taking power therefrom. The generator comprises a rotor incorporated in the fan and a stator incorporated in the fan casing. This disposition for the electricity generator avoids problems of engine operability at low speed and enables mechanical power to be converted into electrical power with high efficiency. In addition, installation and maintenance of the electricity generator are facilitated by the generator being implanted in the fan.

18 Claims, 2 Drawing Sheets

TURBOJET HAVING AN ELECTRICITY GENERATOR ARRANGED IN ITS FAN

FIELD OF THE INVENTION

The invention relates to a two-spool turbojet comprising a high pressure spool and a low pressure spool; the invention relates more particularly to an improvement enabling mechanical power to be taken off so as to provide electricity to the remainder of the airplane.

BACKGROUND OF THE INVENTION

Conventionally, a two-spool turbojet comprises an engine nacelle housing a high pressure spool comprising a high pressure compressor and a high pressure turbine, and a low pressure spool comprising a low pressure compressor and a low pressure turbine and driving the fan.

The function of such a turbojet is generally not only to provide the airplane with thrust, but also to provide the airplane with electricity for various purposes such as powering computers, cabin lighting, etc.

The present trend is to increase the amount of mechanical power that is taken off and converted into electrical power, given the increasing role played by electrical means, which have the reputation of being flexible in use on board an airplane.

An electricity generator is used for transforming a fraction of the mechanical power delivered by the turbojet into electricity.

The generator is not usually situated in the turbojet. A secondary shaft is connected via gearing to one of the shafts of the turbojet, thereby setting it into rotation when the engine is operating, and thus transmitting thereto the mechanical power needed to make the electricity generator operate. The generator may be placed close to the end of the shaft, outside the turbojet.

In another known configuration, described in PCT international application WO 2007/036202, the electricity generator may also be arranged inside the turbojet, and more precisely inside the high pressure spool. Advantageously, that generator operates reversibly, so that it also acts as a starter.

When starting a turbojet, the high pressure spool is the first to be put into rotation using an electricity generator operated as an electric motor. The high pressure compressor then feeds the combustion chamber with air under pressure, thereby enabling combustion to be established, and enabling the high pressure stage of the turbojet to start. The low pressure turbine is then driven in rotation by the exhaust stream of primary air, thereby driving the low pressure spool and the fan. Once the turbojet has started, the power supply to the electric starter is switched off so it ceases to act as a motor driving the high pressure compressor.

Arranging the electricity generator in the high pressure spool has as its main advantage the fact that the generator can be used both as an electric motor for starting the turbojet, as described above, and also as an electricity generator for delivering electricity to the remainder of the airplane.

Nevertheless, that configuration presents various drawbacks. The most noticeable is the poor overall efficiency with which mechanical power is converted into electrical power when the electricity generator is disposed in that way. The extra consumption of fuel needed to provide given electrical power is greater when the electricity generator takes power from the high pressure spool than when it takes power from the low pressure spool.

Furthermore, arranging the electricity generator in the high pressure spool is difficult. The spool constitutes a region of small diameter that includes numerous pipes. The generator is thus difficult to put into place and to maintain.

Furthermore, since the vanes of the high pressure compressor are generally variable-pitch vanes, it is difficult to reduce the distance or airgap between the rotor and the stator. As a result, the electricity generator made in that way usually presents relatively low efficiency.

Finally, installing an electricity generator that draws its power from the high pressure spool can raise a problem of turbojet operability. If too much mechanical power is taken, then there is a negative effect on the operation of the high pressure spool that can lead to pumping of the high pressure compressor, in particular when the engine is operating at slow speed.

Another known way of taking mechanical power from a turbojet in order to produce electricity is described in PCT international application WO 2005/073519.

In order to generate electricity, that document proposes adding an additional turbine that is dedicated to producing electricity and that is located downstream from the fan in the secondary stream of a turbojet, said turbine rotating independently of the spools of the turbojet.

Nevertheless, adding that turbine makes the structure of the turbojet much more complex and increases its weight and its volume. In addition, the efficiency with which mechanical power is converted into electrical power is relatively low.

OBJECT AND SUMMARY OF THE INVENTION

The object of the invention is to define a turbojet comprising a high pressure spool, a low pressure spool driving a fan disposed in a stationary casing, and an electricity generator arranged in the fan, taking power therefrom, and including a rotor incorporated in the fan, without presenting the above-mentioned drawbacks.

This object is achieved by the fact that the electricity generator also includes a stator incorporated in the fan casing.

The arrangement of the electricity generator in the fan, i.e. more precisely on moving portions of the fan and on stationary portions such as the fan casing, presents several advantages.

A first advantage lies in the fact that a large amount of room is available for the electricity generator. The fan casing, which is a portion of the engine nacelle, is sufficiently large to house the windings that enable electricity to be produced together with the electrical harnesses that enable said electricity to be taken to the pylon supporting the turbojet. Installation and maintenance of the electricity generator are therefore disturbed little or not at all by problems of available space.

Furthermore, the fan is a cold zone, thereby avoiding problems that might be caused by high temperatures. Thus, in the electricity generator of the invention, the magnets are not cooled, since the temperature within the fan never reaches the Curie temperature above which they would lose their magnetic properties.

For the same reason, since the windings of the electricity generator are in a cold zone of the turbojet, they require relatively little cooling. The means for cooling them can therefore be small in size and weight.

Furthermore, it should be observed that the electricity generator is constituted in part by elements of the turbojet (the fan blades, its casing), which elements are needed in the turbojet independently of the presence of the electricity generator. As a result, the increase in the weight of the turbojet that is due solely to the electricity generator remains small.

In addition, because of the large size of the fan, it is possible to make an electricity generator of relatively large power, suitable for feeding electricity simultaneously to various pieces of electrical equipment of the aircraft on which the turbojet is mounted. This is particularly important since the number of pieces of electrical equipment, to be found on board airplanes is increasing.

Finally, as mentioned above, it is better to take power from the low pressure spool rather than from the high pressure spool. By arranging the electricity generator in the fan, this condition is satisfied and better efficiency is thus obtained, with better conversion of mechanical power into electrical power, and above all, avoiding the problems of turbojet operability and instability at low speeds that arise when too much power is taken from the high pressure spool.

Furthermore, it is also possible to provide another electricity generator in the turbojet that is connected to the high pressure spool and that takes power therefrom.

The presence of such a second electricity generator in addition to the electricity generator located in the fan enables power to be taken by the two electricity generators in shared manner, thereby further enhancing engine operability, in particular at low speeds.

The electricity generator that is arranged in the fan is not suitable for use as an electric motor for starting the turbojet.

An additional advantage of the second electricity generator taking power from the high pressure spool is that it can be a dual-purpose generator, i.e. it can also operate as an electric motor: it can therefore be used for starting the turbine engine. The turbine engine thus includes not only the generator located in the fan, but also another generator and/or starter respectively taking power from and/or delivering power to the high pressure spool.

BRIEF DESCRIPTION OF THE DRAWINGS

The invention can be well understood and its advantages appear better on reading the following detailed description of embodiments given as non-limiting examples. The description refers to the accompanying drawings, in which.

MORE DETAILED DESCRIPTION

Figure 1:
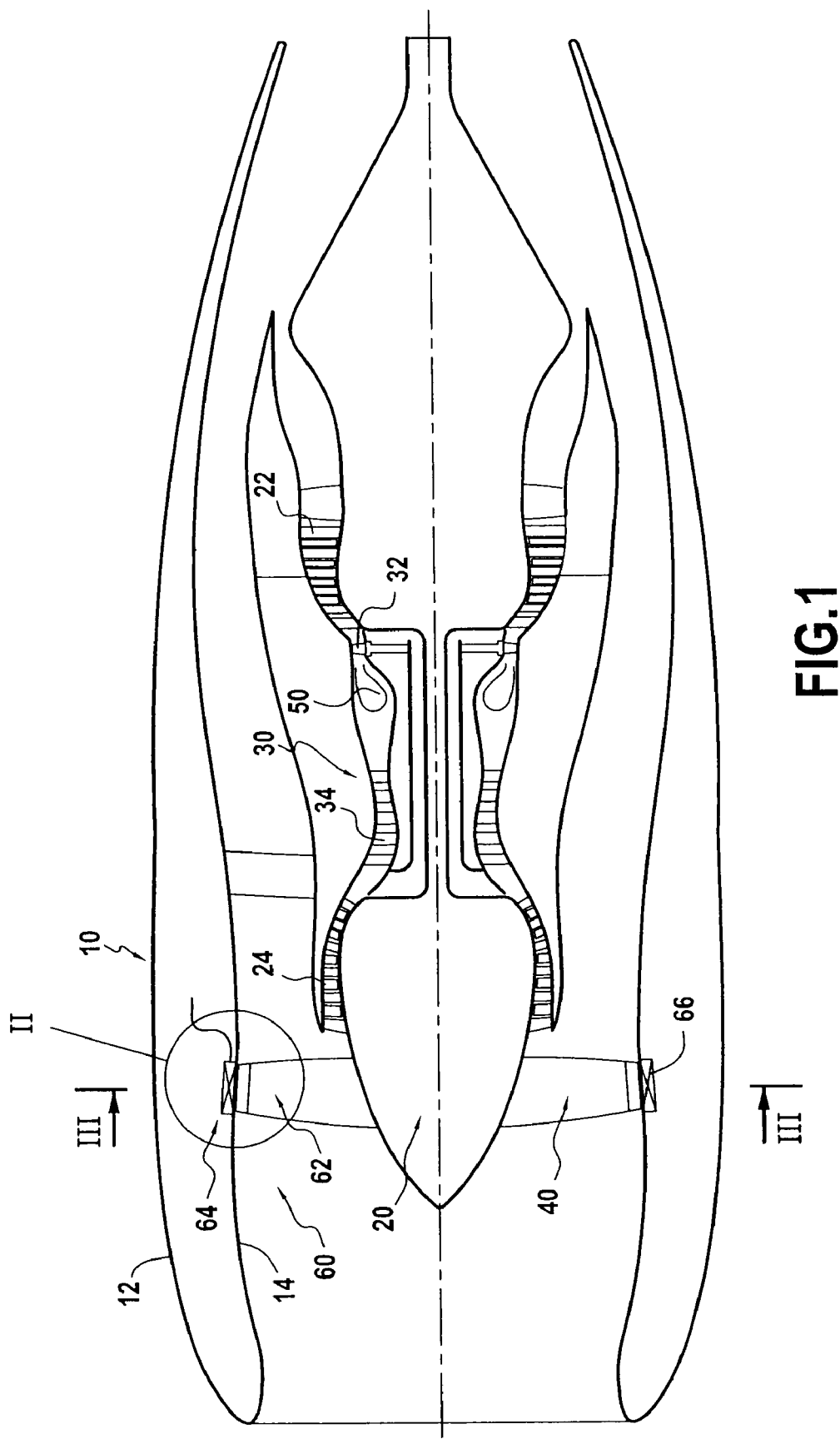
FIG. 1 is a diagrammatic view of a two-spool turbojet to which the invention applies.

The turbojet 10 shown in the figures is of the conventional two-spool type, having a high pressure spool 30 with a high pressure compressor 34 and a high pressure turbine 32, and a low pressure spool 20 with a low pressure compressor 24 and a low pressure turbine 22. The low pressure spool 20 drives a fan 40 disposed in a fan casing 14. The fan casing 14 itself forms part of the engine nacelle 12 of the turbojet 10.

Figure 2:
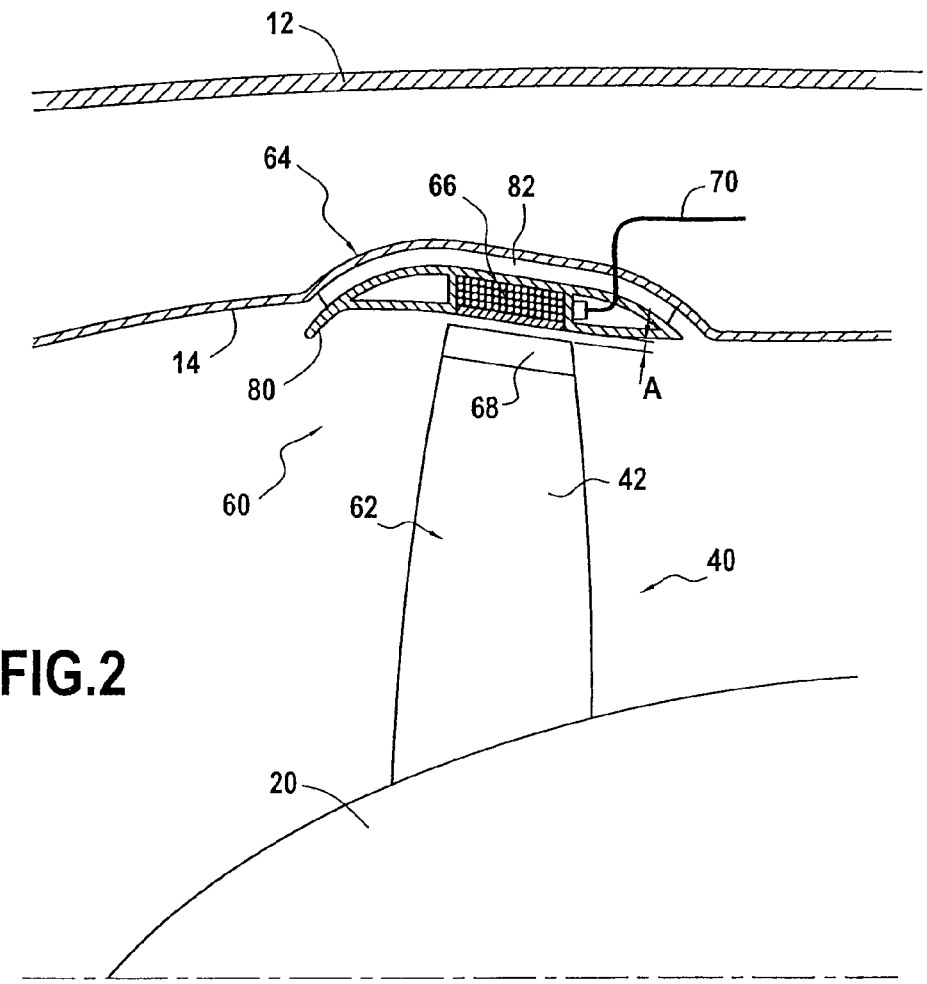
FIG. 2 is a diagrammatic view showing more particularly the means of the invention.

A preferred embodiment of the invention is described below with reference to FIG. 2. This figure shows the region of the turbojet in which the electricity generator 60 of the invention is arranged, i.e. the fan region.

The electricity generator 60 is located at the periphery of the fan and comprises a rotor 62 incorporated with the radially outer ends of the fan blades, and a stator 64 incorporated in the fan casing.

The rotor 62 includes permanent magnets 68 fastened to the ends of the fan blades 42 so as to create a rotating field; it is thus located inside the fan casing and does not increase the diameter thereof, thus enabling the generator to be added in the fan (and its casing) without any increase in the diameter of the fan casing or of the engine nacelle.

Advantageously, the rotor 62 thus comprises only parts that are simple and solid, without any windings or complex parts, more likely to become damaged by the high centrifugal forces that act on the ends of the fan blades.

If the number of the blades in the fan is N, then the generator is constituted by N/2 pairs of poles. It is also possible to envisage not fitting all of the blades with a magnet, for example fitting only every other blade.

The magnets 68 may be made of samarium-cobalt, a material that is commonly used for this type of electricity generator.

The magnets are fastened to the ends of the fan blades 42, e.g. by adhesive. They are disposed in such a manner as to minimize the airgap A between the magnets 68 and the winding 66. Advantageously, when the airgap A decreases, both the efficiency of the electricity generator 60 and the efficiency of the fan 40 are increased.

Figure 3:
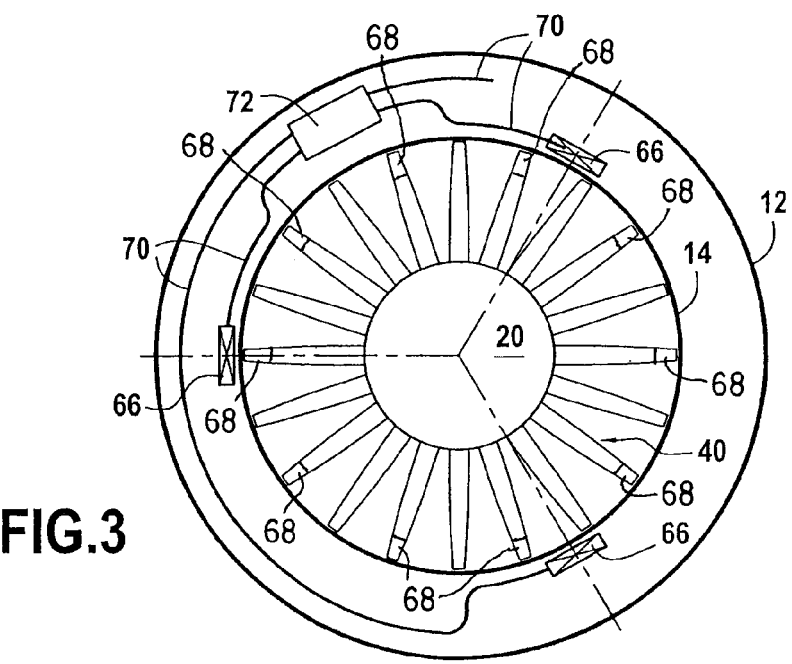
FIG. 3 is a front view of the turbojet showing the positions of the windings of the electricity generator.

The stator portion is constituted by windings 66 incorporated in the fan casing. These stator coils or windings 66 may be made of copper. They are disposed in register with the place where the magnets 68 pass during rotation of the blades 42 of the fan 40. Advantageously, and in order to obtain three-phase alternating current (AC), as shown in FIG. 3, the stator 64 has three windings. In another embodiment, it could have three identical groups of windings spaced apart respectively at 120° about the axis of the turbine engine.

The stator portion is thus the electricity source proper. Advantageously, the stator portion is stationary, thereby making it simple to convey electricity to other equipment in the airplane for consuming the electricity.

In order to cool the stator 64 of the electricity generator (and in particular the windings 66), each of the windings 66 is provided with a scoop or deflector 80 disposed inside the fan casing to take off a fraction of the air stream entering into the engine nacelle. This scoop or deflector takes cool air admitted into the engine nacelle casing and directs it into a cooling pipe 82 passing close to the winding 66 in order to cool it.

Naturally, variations in the speed of rotation of the engine will give rise to variations in the electricity delivered by the generator, in particular in terms of voltage and frequency. In order to regulate the electricity and obtain a direct current (DC) voltage, the generator also includes an AC/DC converter 72 connected at the output from the windings 66, i.e. in the electricity circuit between the windings and those portions of the airplane that are electrically powered.

Electrical harnesses 70 serve to convey the electricity generated by the stator 64 of the electricity generator 60 to the airplane. These harnesses 70 pass through the engine nacelle casing and they are connected to the electricity network of the airplane via the engine-supporting pylon.

Finally, it should be observed that advantageously, since the speeds reached at the ends of the blades are relatively high (while remaining subsonic), the power delivered by the electricity generator can be quite considerable without there being any need to use magnets and/or windings of large dimensions for that purpose.

What is claimed is:

1. A turbojet comprising:
    a high pressure spool;
    a low pressure spool driving a fan disposed in a stationary casing; and
    an electricity generator arranged in the fan, taking power therefrom, the electricity generator including a rotor incorporated in the fan and a stator incorporated in the fan casing, the rotor including permanent magnets fastened to blades of the fan and the stator including windings, wherein the windings are provided inside a scoop disposed inside the fan casing, wherein a cooling tube in fluid communication with cool air admitted into an engine nacelle casing is disposed at an outer surface of the scoop to cool the windings, and wherein a radial gap is provided between an inner surface of the scoop and tips of the fan blades.

2. A turbojet according to claim 1, wherein the permanent magnets are fastened to the tips of the fan blades.

3. A turbojet according to claim 2, wherein said magnets are fastened by adhesive.

4. A turbojet according to claim 1, further including another generator and/or starter respectively taking or delivering power to the high pressure spool.

5. A turbojet according to claim 1, wherein the stator has exactly three windings.

6. A turbojet according to claim 1, wherein said electricity generator further includes an AC/DC converter.

7. A turbojet comprising:

a fan disposed in a stationary casing;

a high pressure spool comprising a high pressure compressor and a high pressure turbine;

a low pressure spool comprising a low pressure compressor and a low pressure turbine and driving said fan; and an electricity generator arranged in the fan, taking power from said fan, the electricity generator including a rotor incorporated in the fan and a stator incorporated in the fan casing, the rotor including permanent magnets fastened to blades of the fan and the stator including windings, wherein the windings are provided inside a scoop disposed inside the fan casing, wherein a cooling tube in fluid communication with cool air admitted into an engine nacelle casing is disposed at an outer surface of the scoop to cool the windings, and wherein a radial gap is provided between an inner surface of the scoop and tips of the fan blades.

8. A turbojet according to claim 7, wherein the permanent magnets are fastened to the tips of the fan blades.

9. A turbojet according to claim 7, wherein said magnets are fastened by adhesive.

10. A turbojet according to claim 7, further including another generator and/or starter respectively taking or delivering power to the high pressure spool.

11. A turbojet according to claim 7, wherein the stator has exactly three windings.

12. A turbojet according to claim 7, wherein said electricity generator further includes an AC/DC converter.

13. A turbojet according to claim 7, wherein the high pressure spool and the low pressure spool are configured to generate sufficient thrust for flying an aircraft.

14. A turbojet according to claim 7, wherein the rotor comprises rotor blades, wherein each rotor blade of at least a first plurality of said rotor blades includes a magnet fastened to an end of said rotor blade.

15. A turbojet according to claim 14, wherein each rotor blade of a second plurality of said rotor blades is free of any magnet.

16. A turbojet according to claim 14, wherein each of said rotor blades of said first plurality includes a root portion, said root portion being free of any magnet.

17. A turbojet according to claim 7, the engine nacelle casing houses said fan, said high pressure spool and said low pressure spool.

18. A turbojet according to claim 17, wherein said fan casing forms a part of said nacelle.

* * * * *